US007640356B2

(12) United States Patent
Ananthakrishnan et al.

(10) Patent No.: US 7,640,356 B2
(45) Date of Patent: Dec. 29, 2009

(54) METHOD AND SYSTEM FOR REDUCING CACHE WARM-UP TIME TO SUPPRESS TRANSMISSION OF REDUNDANT DATA

(75) Inventors: Hariharan Ananthakrishnan, Chennai (IN); Mahesh Vittal, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 578 days.

(21) Appl. No.: 11/372,708

(22) Filed: Mar. 10, 2006

(65) Prior Publication Data

US 2007/0234324 A1    Oct. 4, 2007

(51) Int. Cl.
*G06F 15/16* (2006.01)
*G06F 13/00* (2006.01)

(52) U.S. Cl. .................. 709/232; 711/130; 711/119

(58) Field of Classification Search ................ 711/119, 711/130, 216; 709/214, 225, 228, 232; 710/118, 710/125; 707/101, 201; 370/231, 233, 351
See application file for complete search history.

(56) References Cited

U.S. PATENT DOCUMENTS

| | | | | |
|---|---|---|---|---|
| 6,438,556 | B1 * | 8/2002 | Malik et al. ................ | 707/101 |
| 6,535,584 | B1 * | 3/2003 | Reinders ................... | 379/88.1 |
| 6,798,765 | B2 * | 9/2004 | Larsson .................... | 370/351 |
| 6,920,477 | B2 * | 7/2005 | Mitzenmacher ............. | 709/203 |
| 7,068,599 | B1 * | 6/2006 | Jiang et al. ............... | 370/230.1 |
| 7,191,290 | B1 * | 3/2007 | Ackaouy et al. ............ | 711/119 |
| 7,206,841 | B2 * | 4/2007 | Traversat et al. ........... | 709/225 |
| 2002/0138841 | A1 * | 9/2002 | Ward ........................ | 725/78 |
| 2005/0138173 | A1 * | 6/2005 | Ha et al. ................... | 709/225 |

OTHER PUBLICATIONS

Fan et al. summary cache: a scalable wide-area web cache snaring protocol vol. 8, Issue 3 (Jun. 2000) table of contents pp. 281-293 Year of Publication: 2000.*
Spring et al, A Protocol-Independent Technique for Eliminating Redundant Network Traffic, Computer Science and Engineering, 352350, University of Washington, Seattle, WA 98195-2350, Copyright 2000 ACM.*
Zou et al. Architecture and Development of Distributed WWW Caching Proxy, Proceedings of the 2002 IEEE Canadian Conference on Electical & Computer Engineering, Copyright 2002 IEEE.*
Athicha Muthitacharoen, Benjie Chen and David Mazieres, "The Low Bandwidth File System", Proceedings of the $18^{th}$ ACM Symposium on Operating Systems Principles SOSP'01, 2001.

(Continued)

*Primary Examiner*—Wing F Chan
*Assistant Examiner*—Jonathan Willis
(74) *Attorney, Agent, or Firm*—Trellis IP Law Group, PC

(57) ABSTRACT

In one embodiment, an optimizing device is used to suppress transmission of redundant data over networks. The first optimizing device receives information regarding associated optimizing devices associated with a second optimizing device. The information regarding the associated optimizing devices is received from the second optimizing device. Moreover, the first optimizing device receives information regarding indices identifying redundant data. The redundant data comprises data transmitted by the second optimizing device to the associated optimizing devices. The information regarding the indices identifying the redundant data is received from the second optimizing device.

34 Claims, 7 Drawing Sheets

OTHER PUBLICATIONS

Neil T. Spring and David Wetherall, "A protocol independent technique for eliminating redundant network traffic", Proceedings of the 2000 ACM SIGCOMM Conference, Aug. 2000, pp. 87-95.

Li Fan, Pei Cao, Jussara Almeida and Andrei Z. Broder, "Summary cache: A scalable wide-area {Web} cache sharing protocol", "IEEE\slash ACM Transactions on Networking", 2000, pp. 281-293, vol. 8, issue No. 3.

* cited by examiner

METHOD AND SYSTEM FOR REDUCING CACHE WARM-UP TIME TO SUPPRESS TRANSMISSION OF REDUNDANT DATA

BACKGROUND OF THE INVENTION

1. Field of Invention

Embodiments of the present invention relate, in general, to networking and more specifically, the embodiments of the present invention relate to methods and systems for reducing the cache warm-up time to facilitate suppression of the transmission of redundant data over networks.

2. Description of the Background Art

In a typical network environment, different network devices are connected through network systems. These network devices transmit and receive data over the network systems. Some of the data is repetitively transmitted across the network systems. Repetitive transmission of the same data is redundant and reduces the available bandwidth across the network systems. This, in turn, slows down network traffic across the network systems and increases latency in data transmission.

According to conventional methods, proprietary schemes are used to suppress the transmission of redundant data across the network systems. Central to these schemes is the use of optimizing devices. The optimizing devices share data caches that store frequently transmitted data. The frequently transmitted data is stored as redundant data along with identifiers identifying them. The optimizing devices prevent transmission of the redundant data across the network system by transmitting identifiers instead of the actual redundant data. Transmission of the identifiers saves considerable bandwidth for transmitting other data, since the size of the identifiers is smaller than that of the redundant data. However, when a new optimizing device is added to the existing network systems, it is not aware which data is redundant data. Therefore, at an initial stage, instead of transmitting the identifiers, the new optimizing device transmits the actual redundant data. A data cache of the new optimizing device requires a considerable amount of time to recognize data as redundant data, in order to transmit the identifiers. The time required by the data cache of the new optimizing device to recognize the redundant data is known as the cache warm-up time. The more time the cache takes to warm up, the longer it takes to suppress the transmission of redundant data.

DETAILED DESCRIPTION OF EMBODIMENTS OF THE INVENTION

Various embodiments of the invention provide methods, systems, and computer-readable media for reducing the cache warm-up time to suppress transmission of redundant data. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention Redundancy in data transmission over networks can be suppressed by using various methods as known in the art. For example, in accordance with an embodiment optimizing devices share data caches. The shared data caches store transmitted data. The transmitted data is identified as redundant data. Transmission of the redundant data across the network systems is prevented by sending indices identifying the redundant data instead of the actual redundant data. Transmission of the indices saves bandwidth for transmitting other data, since the size of the indices is smaller than that of the redundant data. When a new optimizing device is added to the existing optimizing devices, it is not aware of the redundant data. Hereinafter, the new optimizing device is referred to as a first optimizing device. Therefore, at the initial stage, instead of transmitting the indices, the first optimizing device transmits the actual redundant data. The time required by a data cache of the first optimizing device to recognize data as redundant data is known as the cache warm-up time. To reduce the cache warm-up time, a look-up table in the data cache of the first optimizing device needs to be populated with the indices of the redundant data. In accordance with various embodiments of the present invention, the first optimizing device obtains information pertaining to the indices of the redundant data from a second optimizing device, which is one of the existing optimizing devices, when the first optimizing device is added.

Figure 1:
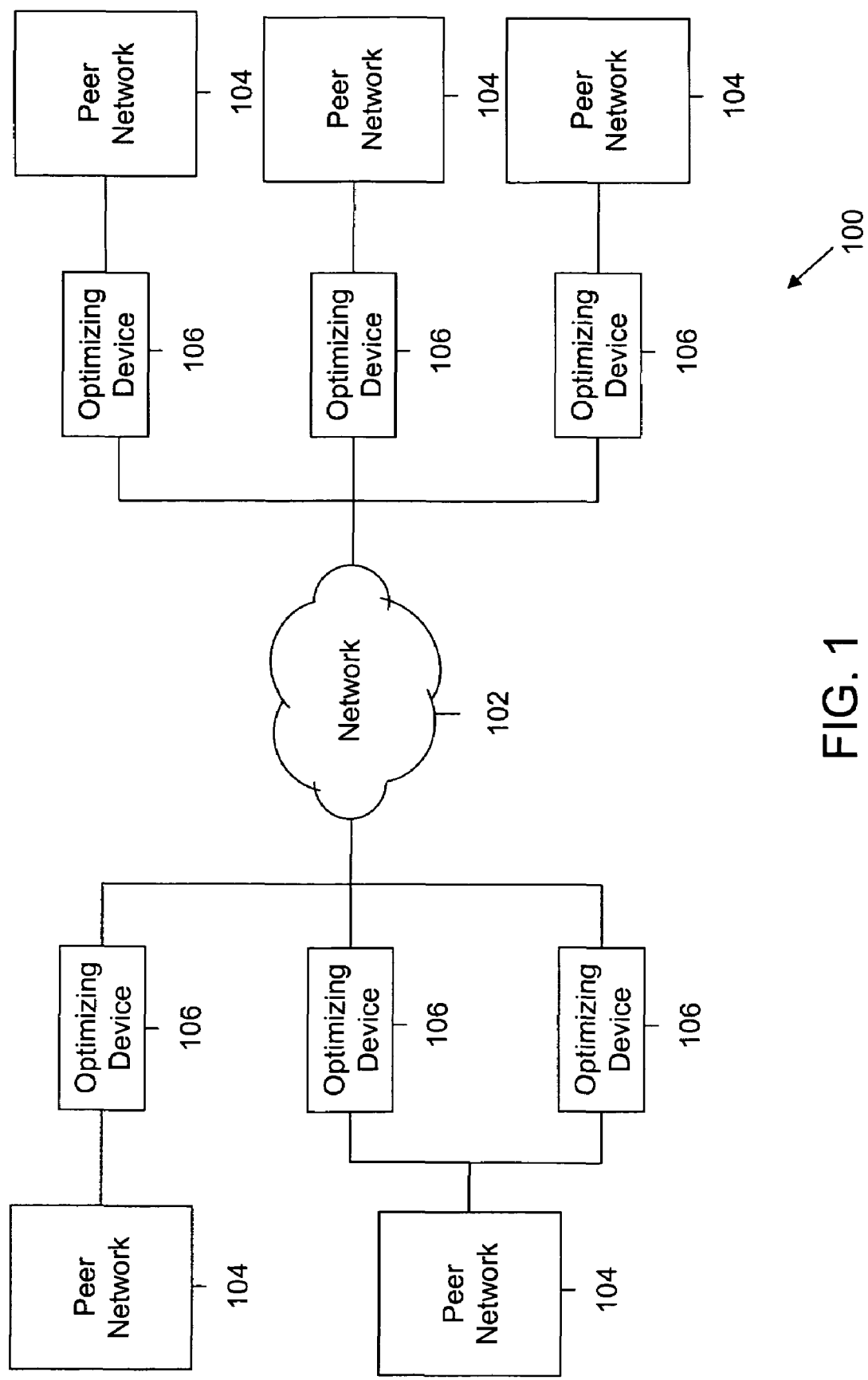
FIG. 1 illustrates a network environment wherein various embodiments of the present invention can be implemented.

Referring now to the drawings, particularly by their reference numbers, FIG. 1 illustrates a network environment 100, wherein various embodiments of the present invention can be implemented. Network environment 100 includes a network 102, peer networks 104, and optimizing devices 106. It is to be understood that the specific designation of a peer network is for the reader's convenience and is not to be construed as limiting network 102 to a specific number of peer networks 104 or to specific types of peer networks 104 present in network 102. Peer networks 104 include optimizing devices 106. It is to be understood that the specific designation of an optimizing device is for the convenience of the reader and is not to be construed as limiting peer networks 104 to a specific number of optimizing devices 106 or to specific types of optimizing devices 106 included in peer networks 104.

Examples of network 102 include but are not limited to Local Area Networks (LANs), Wide Area Networks (WANs), Metropolitan Area Networks (MANs), and Personal Area Networks (PANs). Network 102 may provide a physical or logical connection between peer networks 104. For example, network 102 can implement this connection as a private leased line, a frame-relay circuit, a Virtual Private Network (VPN), and so forth. Peer networks 104 share data and services across network 102 and can be connected through network 102 in various network topologies. Examples of the network topologies include mesh, star, ring, and bus topologies.

Each peer network from peer networks 104 can transmit and receive data and can include one or more optimizing devices 106. A peer network that transmits data is hereinafter referred to as a transmitting peer network. Any data to be transmitted by transmitting peer network-to-network 102 is redirected to a transmitting optimizing device from optimizing devices 106 included in the transmitting peer network. A receiving peer network receives the transmitted data. The data received at the receiving peer network is intercepted and redirected to a receiving optimizing device from optimizing devices 106 included in the receiving peer network.

In accordance with various embodiments of the present invention the transmitting optimizing device keeps track of redundant data, along with the identifying indices, by maintaining a look-up table. This look-up table is maintained in a data cache at the transmitting optimizing device. Similarly, the receiving optimizing device keeps track of redundant data, along with the identifying indices, by maintaining a look-up table in a data cache at the receiving optimizing device.

Figure 2:
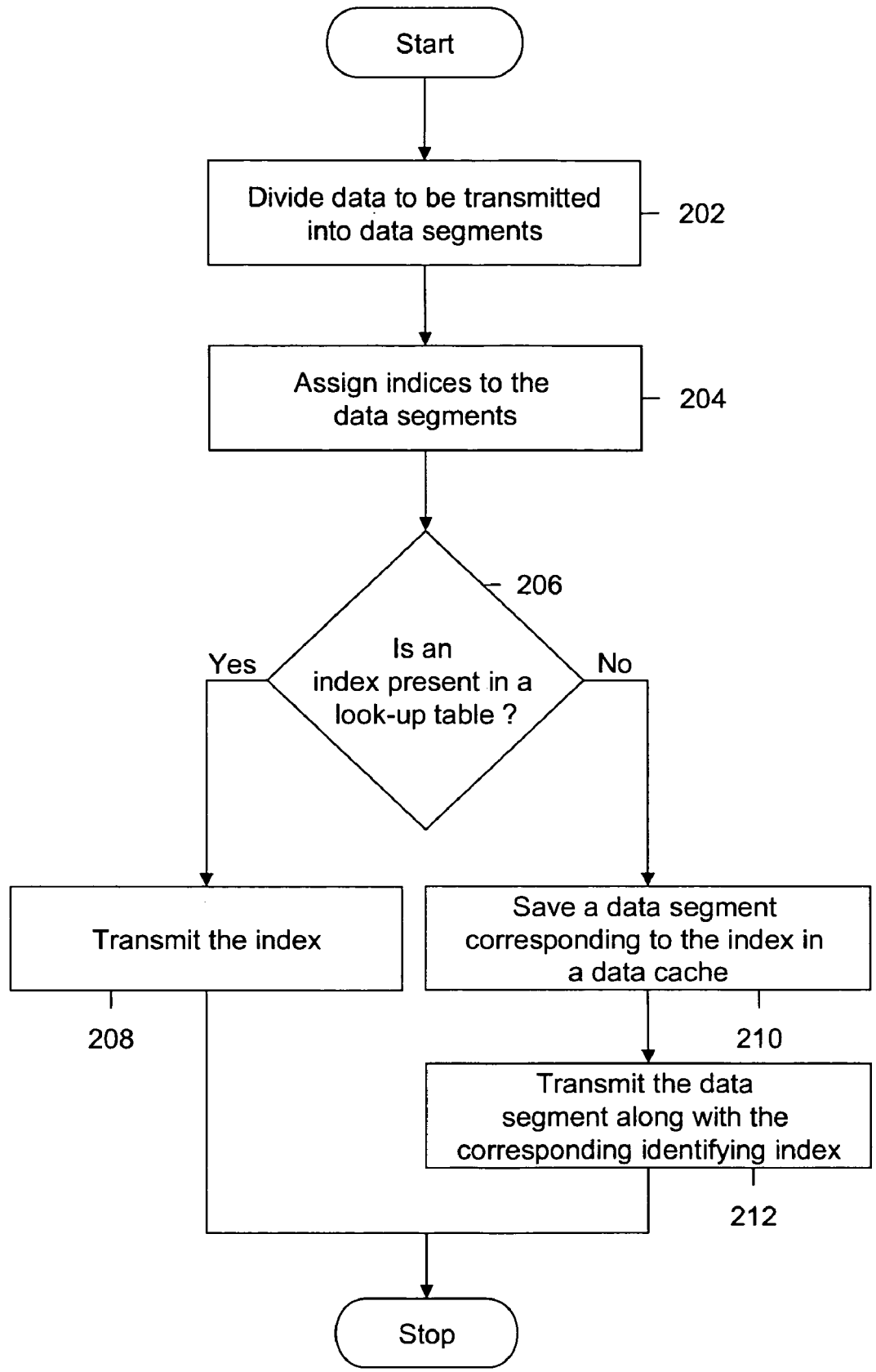
FIG. 2 is a flowchart illustrating a method for suppressing redundancy in data transmission over networks, in accordance with an embodiment of the present invention.

FIG. 2 is a flowchart illustrating a method for suppressing redundancy in data transmission over network 102, in accordance with an embodiment of the present invention. At step 202, a transmitting optimizing device divides the data to be transmitted into data segments. At step 204, the transmitting optimizing device assigns indices to identify the data segments. In accordance with various embodiments of the present invention, the transmitting optimizing device generates the indices by using the Secure Hash Algorithm 1 (SHA1) hash function, the Message-Digest Algorithm 5 (MD5) hash function, or other similar methods for generating indices. A hash function is an algorithm used to identify a data segment. Further, the transmitting optimizing device performs steps 206 to 212 for each index. At step 206, the transmitting optimizing device checks whether an index identifying the data segment is present in a look-up table that is included in a data cache at the transmitting optimizing device. If the index is present in the look-up table, step 208 is performed. At step 208, the transmitting optimizing device transmits the index. If the index is not present in the look-up table, step 210 is performed. At step 210, the data segment is saved in the data cache along with the identifying index. Further, at step 212, the transmitting optimizing device transmits the data segment along with the identifying index of the data segment to a receiving optimizing device.

Figure 3:
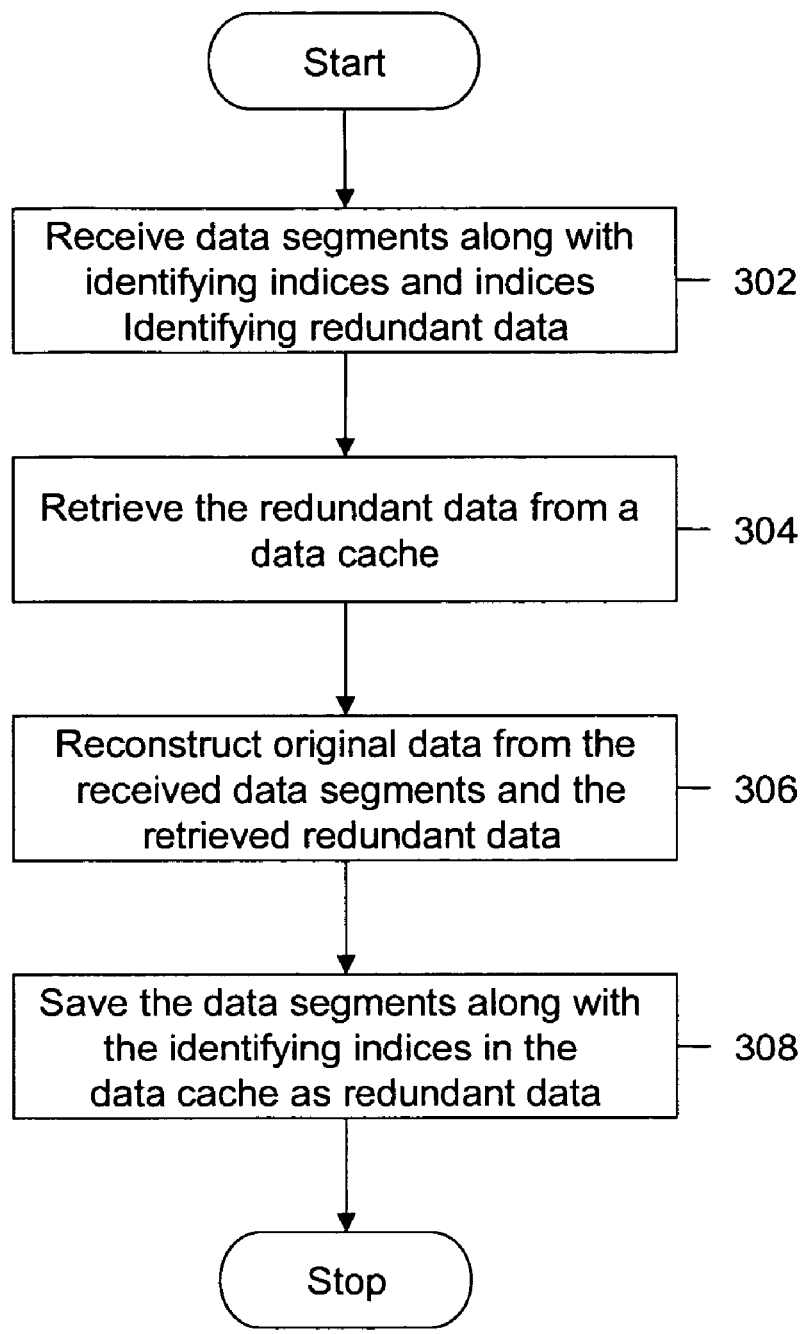
FIG. 3 is a flowchart illustrating a method for reconstructing data, in accordance with an embodiment of the present invention.

FIG. 3 is a flowchart illustrating a method for reconstructing data, in accordance with an embodiment of the present invention. At step 302, a receiving optimizing device receives data segments along with corresponding identifying indices and indices identifying redundant data segments from a transmitting optimizing device. At step 304, the receiving optimizing device retrieves the redundant data segments from data cache at the receiving optimizing device. This retrieval is performed on the basis of the received indices identifying the redundant data segments. At step 306, the receiving optimizing device reconstructs originally transmitted data from the retrieved redundant data segments and the received data segments. Thereafter, at step 308, the receiving optimizing device saves the received data segments as redundant data segments along with the identifying indices. In an embodiment of the present invention, the redundant data segments are saved in the data cache and the identifying indices are saved in the look-up table in the data cache of the receiving optimizing device.

Figure 4:
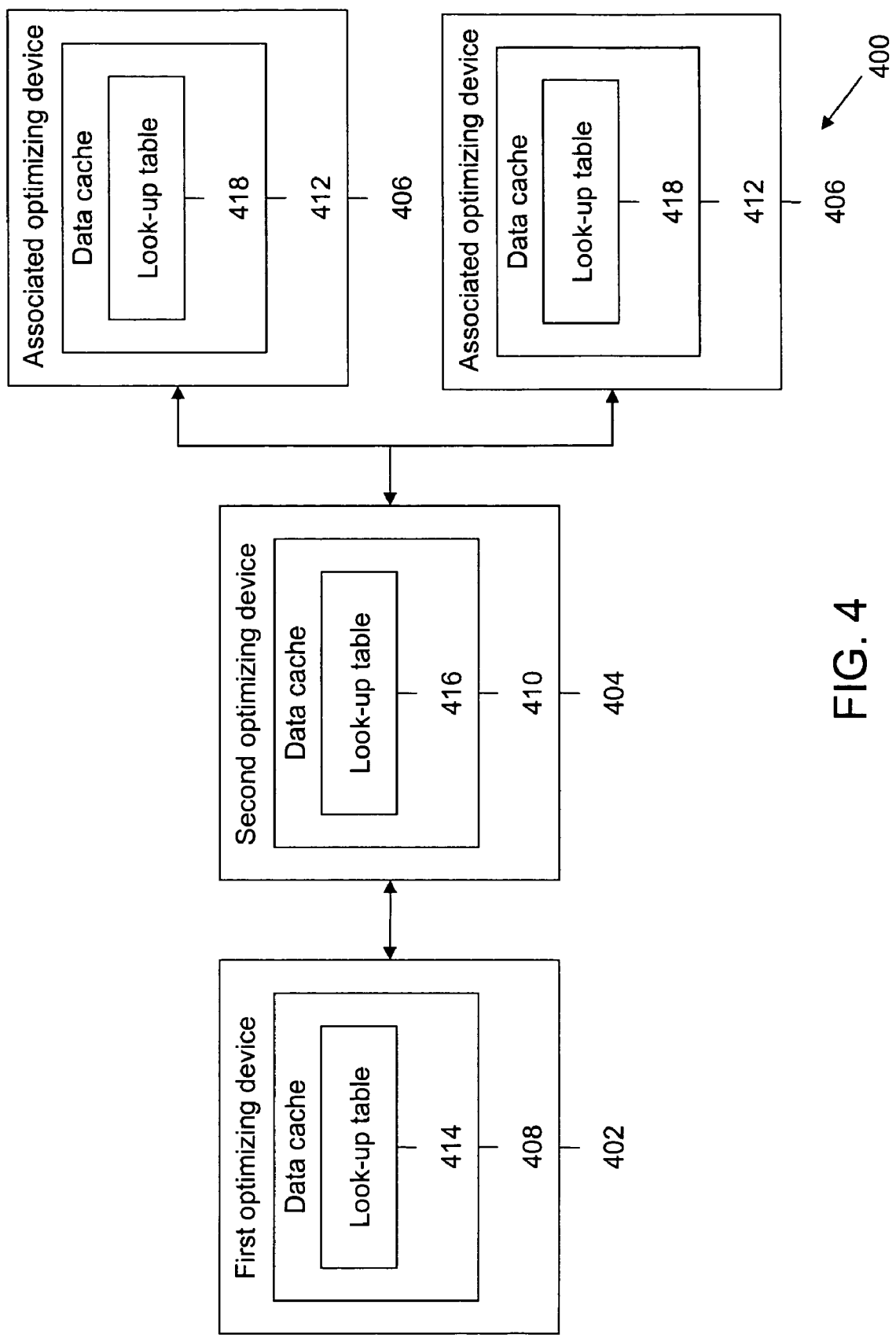
FIG. 4 illustrates various elements of a system for reducing the cache warm-up time to suppress transmission of redundant data, in accordance with various embodiments of the present invention.

FIG. 4 illustrates various elements of system 400 for reducing the cache warm-up time to suppress the transmission of redundant data, in accordance with various embodiments of the present invention. System 400 includes first optimizing device 402, second optimizing device 404, and a third optimizing device. The third optimizing device is associated with second optimizing device 404. Such optimizing devices included in system 400 are hereinafter referred to as associated optimizing devices 406. It is to be understood that the specific designation for associated optimizing devices 406 is for the convenience of the reader and is not to be construed as limiting second optimizing device 404 associated with a specific number or type of associated optimizing devices 406.

First optimizing device 402 is a new optimizing device added to system 400. First optimizing device 402 interacts with second optimizing device 404 that is already included in system 400. Further, second optimizing device interacts with associated optimizing devices 406 that are optimizing devices 106 included in system 400.

First optimizing device 402 includes data cache 408, to store redundant data. In accordance with various embodiments of the present invention, data cache 408 includes a look-up table 414. In an embodiment of the present invention, the redundant data is stored in data cache 408 and the identifying indices are stored in look-up table 414.

Similarly, second optimizing device 404 includes a data cache 410 and a look-up table 416. Data cache 410 and look-up table 416 are used to store redundant data and indices identifying the redundant data.

Further, associated optimizing devices 406 include data caches 412 and look-up tables 418.

Any optimizing device from first optimizing device 402, second optimizing device 404, and associated optimizing devices 406, can act as a transmitting optimizing device and/or a receiving optimizing device.

Figure 5:
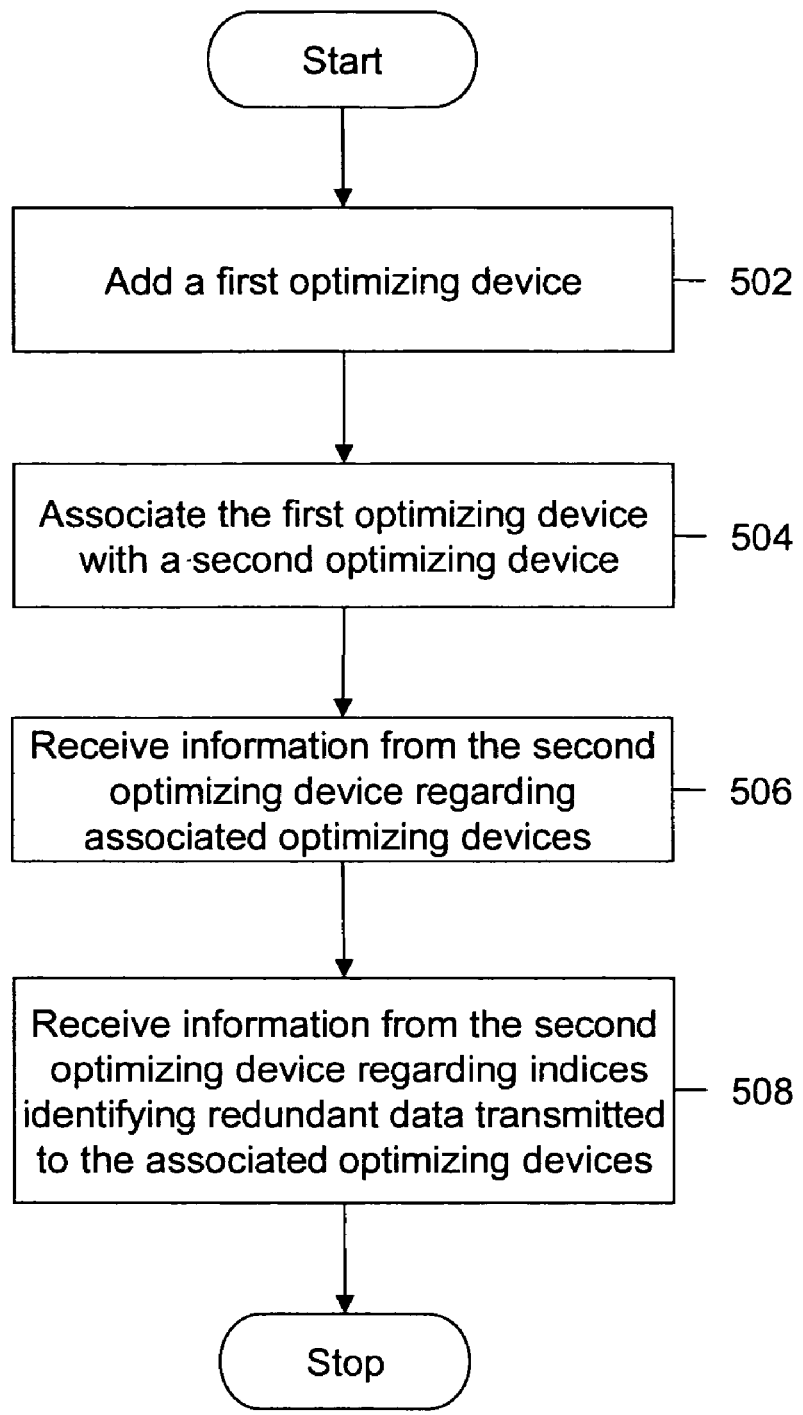
FIG. 5 is a flowchart illustrating a method for reducing the cache warm-up time to suppress transmission of redundant data, in accordance with various embodiments of the present invention.

FIG. 5 is a flowchart, illustrating a method for reducing the cache warm-up time to suppress transmission of redundant data, in accordance with various embodiments of the present invention. At step 502, first optimizing device 402 is added to system 400. At step 504, first optimizing device 402 interacts with second optimizing device 404. When first optimizing device 402 is added to system 400, data cache 408 does not include redundant data and corresponding indices. Therefore, look-up table 414 of first optimizing device 402 requires to be populated. Look-up table 414 of first optimizing device 402 is populated at steps 506 and 508. At step 506, first optimizing device 402 receives information from second optimizing device 404 pertaining to associated optimizing devices 406. At step 508, first optimizing device 402 receives information from second optimizing device 404 about indices identifying redundant data transmitted to associated optimizing devices 406 by second optimizing device 404. The information received regarding associated optimizing devices 406 and regarding indices identifying redundant data transmitted to associated optimizing devices 406 by second optimizing device 404 is populated in look-up table 414. Therefore, look-up table 414 of first optimizing device 402 is populated by second optimizing device 404. Populating look-up table 414 of first optimizing device 402 at initial stage reduces the cache warm-up time of first optimizing device 402. Thereafter, first optimizing device 402 transmits the indices of data that are stored as redundant in second optimizing device 404 and associated optimizing devices 406.

In accordance with an embodiment of the present invention, second optimizing device 404 informs first optimizing device 402 regarding a set of associated optimizing devices from associated optimizing devices 406 with which the first optimizing device interacts. Hereinafter; this set of associated optimizing devices is referred to as a hot working set of peers. In accordance with an embodiment of the present invention, the number of interactions between an associated optimizing device and first optimizing device 402 needs to be more than a predefined number of times in a predefined time period, in order to qualify the associated optimizing device as belonging to the hot working set of peers. The predefined number of times can be either user-defined or system-defined. Similarly, the predefined time period can be either user-defined or system-defined.

Figure 6:
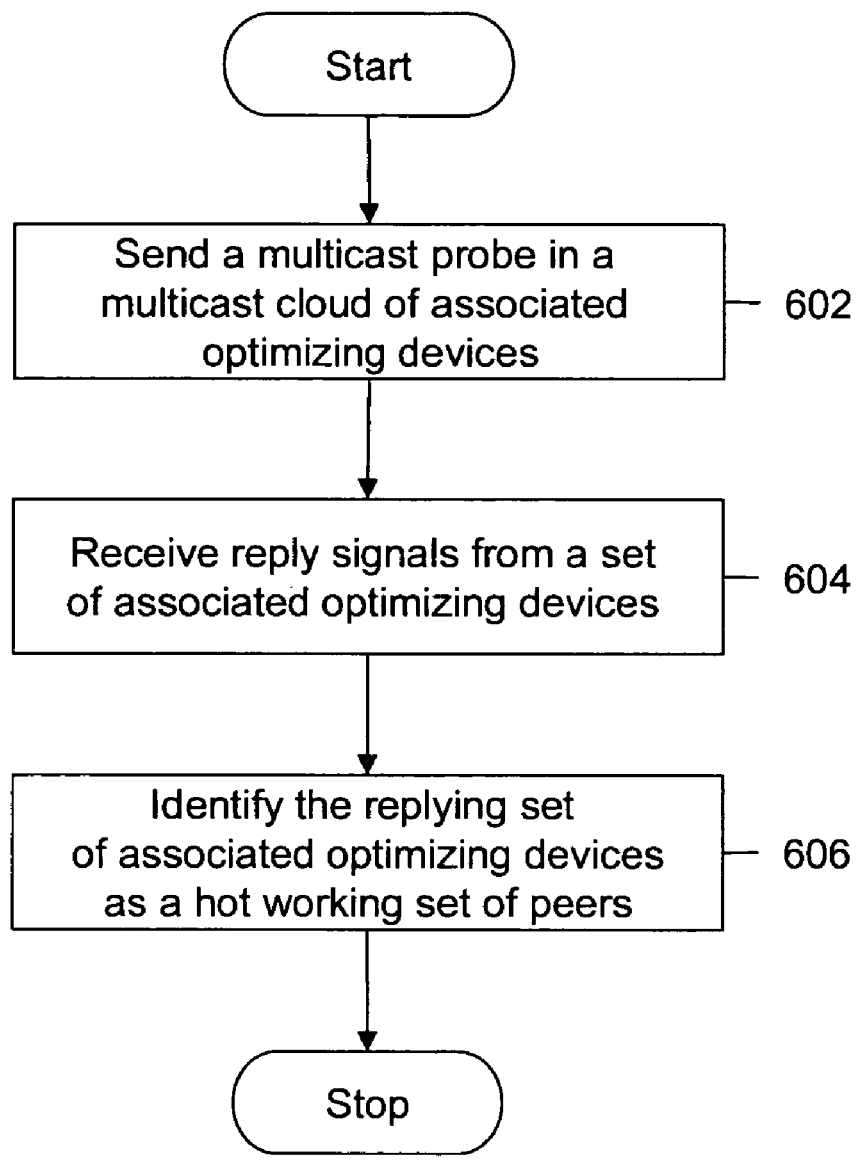
FIG. 6 is a flowchart illustrating a method for identifying a hot working set of peers, in accordance with an embodiment of the present invention.

FIG. 6 is a flowchart illustrating a method for identifying a hot working set of peers, in accordance with an embodiment of the present invention. At step 602, first optimizing device 402 sends a multicast probe in a multicast cloud of associated optimizing devices 406. Thereafter, at step 604, first optimizing device 402 receives a reply signal from a set of associated optimizing devices included in associated optimizing devices 406. Subsequently, at step 606, the replying set of associated optimizing devices is identified as a hot working set of peers.

In accordance with an embodiment of the present invention, the hot working set of peers is identified by managing network hierarchy. The network hierarchy is an abstraction of network topology. The network hierarchy is managed by Manually Organized Distributed Architecture (MODA) or by Self Organizing Distributed Architecture (SODA).

MODA allows a network administrator to manage the network hierarchy manually. MODA employs a central managing device. The central managing device identifies the hot working set of peers on the basis of static information obtained from the managed network hierarchy.

Using SODA the network hierarchy is managed automatically by making use of a Tree Building Protocol (TBP). SODA facilitates identification of the hot working set of peers on the basis of dynamic information obtained from the managed network hierarchy.

In accordance with another embodiment of the present invention, the hot working set of peers is auto-discovered. When first optimizing device 402 is added to an existing network, second optimizing device 404 transmits indices of the hot working set of peers from associated optimizing devices 406.

In accordance with an embodiment of the present invention, first optimizing device 402 receives information pertaining to indices identifying redundant data corresponding to a hot working set of peers. The redundant data comprises data transmitted by second optimizing device 404 to the hot working set of peers.

In accordance with another embodiment of the present invention, second optimizing device 404 informs first optimizing device 402 regarding a hot working set of indices. The hot working set of indices identify redundant data transmitted by second optimizing device 404 to associated optimizing devices 406 more than a predefined number of times. The predefined number of times can be either user-defined or system-defined.

Figure 7:
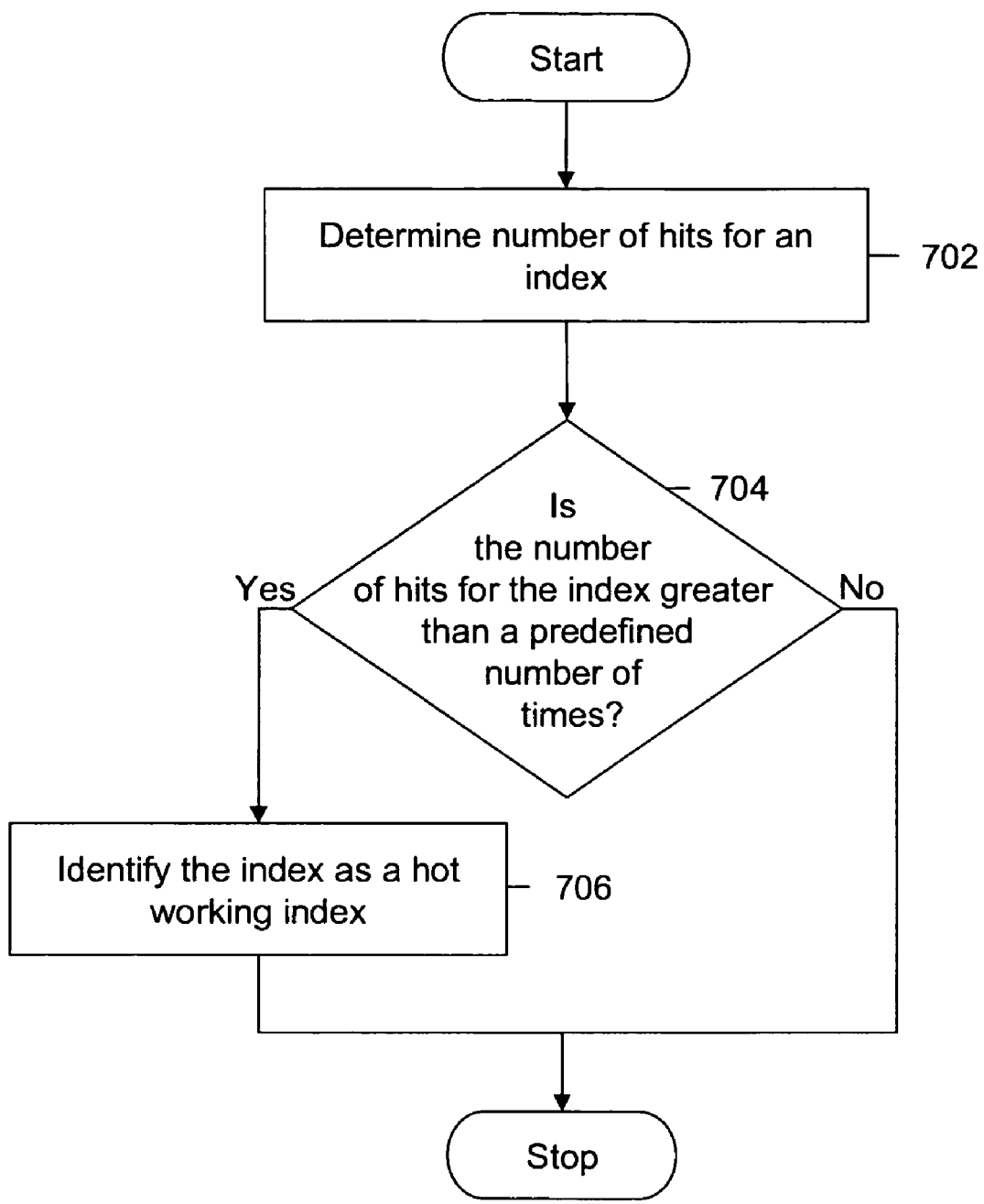
FIG. 7 is a flowchart illustrating a method for identifying a hot working index, in accordance with an embodiment of the present invention.

FIG. 7 is a flowchart illustrating a method for identifying a hot working index, in accordance with an embodiment of the present invention. The hot working index is determined by using a heuristically guided technique. At step 702, second optimizing device 404 determines the number hits for an index stored in look-up table 416 of second optimizing device 404. Further, second optimizing device 404 performs step 704 for each index stored in look-up table 416 of second optimizing device 404. Second optimizing device 404 checks whether the number of hits for the index is more than a predefined number of times that can be either user-defined or system-defined. If it is found that the number of hits for the index is more than the predefined number of times, step 706 is performed. At step 706, the index is identified as a hot working index. The hot working set of indices is obtained once all the hot working indices in look-up table 416 of second optimizing device 404 have been obtained.

In accordance with an embodiment of the present invention, the hot working set of indices is compressed by using a compression algorithm. Examples of compression algorithms include but are not limited to the Zip LIBrary (ZLIB) compression algorithm, the Lempel Ziv Oberhumer (LZO) compression algorithm, and the Wilson Kaplan Direct Mapped (WKDM) compression algorithm. The compression algorithms facilitate reduction in the size of the hot working set of indices. First optimizing device 402 expands the compressed hot working set of indices and obtains the original hot working set of indices.

In accordance with another embodiment of the present invention, the hot working set of indices is summarized by using a bloom filter. This bloom filter represents the hot working set of indices of n elements, to support queries pertaining to membership. The bloom filter allocates a vector v of m bits, initially all set to zero. The bloom filter chooses k independent hash functions, h1, h2, h3, etc., each with a range $\{1, 2, 3, 4, \ldots, m\}$. For each hot working index, the bits at positions h1, h2, h3 till hk in v are set to 1. A query results in a zero if the required index is not included in the hot working set of indices. If the query does not result in a zero, it can be concluded that the required index is included in the hot working set of indices. If the required index is not included in the hot working set of indices, the query result is termed as false positive. The false positive result sends a Negative ACKnowledgement (NACK). The number of NACKs in system 400 needs to be reduced in order to save bandwidth effectively. The number of NACKs in system 400 can be reduced by choosing the parameters m and k, such that a fewer number of false positive results is obtained.

In accordance with an embodiment of the present invention, each optimizing device from optimizing devices 106 maintains a local bloom filter. Each of the optimizing devices updates the local bloom filter at a predefined time interval. In an embodiment of the present invention, the user defines the predefined time interval. In another embodiment of the present invention, the predefined time interval is system-defined and is variable.

In accordance with an embodiment of the present invention, the data cache of each optimizing device from optimizing devices 106 is pinned. The pinning of the data caches prevents automatic refreshing of the data caches. Consider, for example, that identifying index A is stored in a data cache. Let the data cache be refreshed automatically in Y minutes. If identifying index A is required after Y minutes, a false positive is obtained, resulting in a NACK. Therefore, to reduce the number of false positives, the data cache is prevented from automatic refreshing by the process of pinning, wherein it is refreshed by conforming to administrative policies.

In accordance with an embodiment of the present invention, first optimizing device 402 receives information regarding a hot working set of indices identifying redundant data corresponding to a hot working set of peers. The hot working set of indices identifies the redundant data comprising data transmitted by second optimizing device 404 to the hot working set of peers for more than a predefined number of times. The predefined number of times can be either user-defined or system-defined.

The method provided by various embodiments of the present invention is used for reducing cache warm-up time of an optimizing device. The optimizing devices are used in various methods for suppressing transmission of redundant data. The method provided by various embodiments of the present invention is not to be construed to be limited to any specific method of suppressing transmission of redundant data.

In accordance with various embodiments of the present invention, a system for reducing the cache warm-up time of a first optimizing device is provided. The system includes means for receiving information at a first optimizing device from a second optimizing device, pertaining to a third optimizing device associated with the second optimizing device; means for receiving information at the first optimizing device from the second optimizing device about indices identifying redundant data transmitted by the second optimizing device to the third optimizing device; and means for transmitting identifying indices corresponding to redundant data to be transmitted to the third optimizing device, wherein the identifying indices are transmitted in place of the redundant data.

According to an embodiment of the present invention, a method for reducing the cache warm-up time of a first optimizing device is provided. The method comprises receiving information at a first optimizing device from a second optimizing device, pertaining to a third optimizing device associated with the second optimizing device; receiving information at the first optimizing device from the second optimizing device about indices identifying redundant data transmitted by the second optimizing device to the third optimizing device; and transmitting identifying indices corresponding to redundant data to be transmitted to the third optimizing device, wherein the identifying indices are transmitted in place of the redundant data.

Various embodiments of the present invention provide a machine-readable medium that includes instructions for reducing the cache warm-up time of a first optimizing device executable by a processor. One or more of these instructions are for receiving information at a first optimizing device from a second optimizing device about a third optimizing device associated with the second optimizing device. Other instructions are for receiving information at the first optimizing device from the second optimizing device regarding indices identifying redundant data transmitted by the second optimizing device to the third optimizing device. Still other instructions are for transmitting identifying indices corresponding to redundant data to be transmitted to the third optimizing device, wherein the identifying indices are transmitted in place of the redundant data.

Various embodiments of the present invention reduce the cache warm-up time of first optimizing device 402 that is added to optimizing devices 106. When first optimizing device 402 is added to optimizing devices 106, it is not aware of the redundant data. The time required by the first optimizing device to recognize data as redundant data and populate look-up table 414 in its data cache 408 is known as the cache warm-up time. To reduce the cache warm-up time, look-up table 414 of first optimizing device 402 needs to be populated with the indices of the redundant data. In accordance with various embodiments of the present invention, first optimizing device 402 obtains information regarding the indices of redundant data from second optimizing device 404 and populates look-up table 414 at data cache 408 of first optimizing device 402.

Although the invention has been discussed with respect to specific embodiments thereof, these embodiments are merely illustrative, and not restrictive, of the present invention. For example, a "method for reducing cache warm-up time of a first optimizing device, wherein an optimizing device is used for suppressing transmission of redundant data over networks" can include any type of analysis, manual or automatic, to anticipate the needs of the networks.

Even though functionality may be described as occurring in a specific network layer (e.g., network or transport layers) other embodiments can achieve benefits by providing such functionality, in whole or in part, at other network layers. For example, transfers of indices can be controlled by application level software so that index sharing can be switched on or off either automatically or under an administrator's control. Such control can be on a per device basis. The extent of index sharing can be parameterized so that index sharing and caching is regulated according to time or location of devices, based on traffic load, quality of service provisioning, content type (e.g., voice over IP, streaming video), etc. Other features are possible.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an"; and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Also in the description herein for embodiments of the present invention, a portion of the disclosure recited in the specification may contain material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

What is claimed is:

1. A method for reducing cache warm-up time of a first optimizing device, the method comprising:
receiving information at a first optimizing device from a second optimizing device regarding a third optimizing device associated with the second optimizing device, wherein the first, second, and third optimizing devices include respective first, second, and third caches: and the first, second, and third caches include respective first, second, and third tables, and wherein the first optimizing device is a new optimizing device that is added to a network that already includes the second and third optimizing devices, wherein receiving the information comprises receiving a hot working set of indices identifying redundant data transmitted by the second optimizing device to a third optimizing device for more than a predefined number of times;
receiving identifying indices at the first optimizing device from the second optimizing device, wherein the identifying indices identify redundant data transmitted by the second optimizing device to the third optimizing device, wherein the first, second, and third caches store the redundant data, and wherein the first, second, and third tables store the identifying indices, and wherein the first table of the first optimizing device is populated with the identifying indices when the first optimizing device is added to the network; and transmitting identifying indices between the first optimizing device and the third optimizing device, wherein the identifying indices correspond to redundant data and are transmitted in place of the redundant data.

2. The method of claim 1, further comprising determining a hot working set of peers, wherein the hot working set of peers includes an optimizing device that is associated with the second optimizing device and interacts with the first optimizing device.

3. The method of claim 2, wherein determining the hot working set of peers comprises determining an optimizing device that is associated with the second optimizing device and interacts with the first optimizing device for a predefined number of times in a predefined time period.

4. The method of claim 2, wherein the hot working set of peers is determined at least in part on the basis of static information by a central managing device.

5. The method of claim 2, wherein the hot working set of peers is determined at least in part on the basis of dynamic information by a Self Organizing Distributed Architecture (SODA).

6. The method of claim 2, wherein determining the hot working set of peers comprises:

sending a multicast probe in a multicast cloud of associated optimizing devices;

receiving reply signals from a set of optimizing devices, wherein the set of optimizing devices are included in the multicast cloud of the associated optimizing devices; and identifying the replying set of optimizing devices as the hot working set of peers.

7. The method of claim 2, wherein receiving the identifying indices comprises receiving identifying indices identifying redundant data transmitted by the second optimizing device to the hot working set of peers.

8. The method of claim 1, wherein receiving the identifying indices comprises:

determining the hot working set of indices using a heuristically guided technique, wherein the heuristically guided technique comprises:

determining number of hits for an index, wherein the number of hits for the index is determined on the basis of number of times the index is transmitted;

identifying a hot working index, wherein the number of hits for the hot working index is more than a predefined number of times in a predefined time period; and determining the hot working set of indices, wherein the hot working set of indices comprises each of the hot working index.

9. The method of claim 1, wherein receiving the identifying indices comprises receiving information regarding the hot working set of indices in a compressed form.

10. The method of claim 1, wherein receiving the identifying indices comprises receiving a summary of the information regarding the hot working set of indices.

11. The method of claim 10, wherein summarizing the hot working set of indices comprises summarizing the hot working set of indices using bloom filters.

12. The method of claim 11, further comprising:

maintaining a local bloom filter at each optimizing device; and updating the local bloom filter periodically.

13. The method of claim 1, further comprising pinning a data cache of each optimizing device, wherein the pinning prevents automatic refreshing of the data cache.

14. A system for reducing cache warm-up time of a first optimizing device, the system comprising:

means for receiving information at a first optimizing device from a second optimizing device regarding a third optimizing device associated with the second optimizing device, wherein the first, second, and third optimizing devices include respective first, second, and third caches: and the first, second, and third caches include respective first, second, and third tables, and wherein the first optimizing device is a new optimizing device that is added to a network that already includes the second and third optimizing devices, wherein receiving the information comprises receiving a hot working set of indices identifying redundant data transmitted by the second optimizing device to a third optimizing device for more than a predefined number of times;

means for receiving identifying indices at the first optimizing device from the second optimizing device, wherein the identifying indices identify redundant data transmitted by the second optimizing device to the third optimizing device, wherein the first, second, and third caches store the redundant data, and wherein the first, second, and third tables store the identifying indices, and wherein the first table of the first optimizing device is populated with the identifying indices when the first optimizing device is added to the network; and means for transmitting identifying indices between the first optimizing device and the third optimizing device, wherein the identifying indices correspond to redundant data and are transmitted in place of the redundant data.

15. A machine-readable storage medium storing instructions for reducing cache warm-up time of a first optimizing device executable by the processor, the instructions comprising:

one or more instructions for receiving information at a first optimizing device from a second optimizing device regarding a third optimizing device associated with the second optimizing device, wherein the first, second, and third optimizing devices include respective first, second, and third caches: and the first, second, and third caches include respective first, second, and third tables, and wherein the first optimizing device is a new optimizing device that is added to a network that already includes the second and third optimizing devices, wherein receiving the information comprises receiving a hot working set of indices identifying redundant data transmitted by the second optimizing device to a third optimizing device for more than a predefined number of times;

one or more instructions for receiving identifying indices at the first optimizing device from the second optimizing device, wherein the identifying indices identify redundant data transmitted by the second optimizing device to the third optimizing device, wherein the first, second, and third caches store the redundant data, and wherein the first, second, and third tables store the identifying indices, and wherein the first table of the first optimizing device is populated with the identifying indices when the first optimizing device is added to the network; and one or more instructions for transmitting identifying indices between the first optimizing device and the third optimizing device, wherein the identifying indices correspond to redundant data and are transmitted in place of the redundant data.

16. The machine-readable storage medium of claim 15, further comprising one or more instructions for determining a hot working set of peers, wherein the hot working set of peers includes an optimizing device that is associated with the second optimizing device and interacts with the first optimizing device.

17. The machine-readable storage medium of claim 16, wherein one or more instructions for determining the hot working set of peers comprises one or more instructions for determining an optimizing device that is associated with the second optimizing device and interacts with the first optimizing device for a predefined number of times in a predefined time period.

18. The machine-readable storage medium of claim 16, further comprising one or more instructions for determining the hot working set of peers at least in part on the basis of static information by a central managing device.

19. The machine-readable storage medium of claim 16, further comprising one or more instructions for determining the hot working set of peers at least in part on the basis of dynamic information by a Self Organizing Distributed Architecture (SODA).

20. The machine-readable storage medium of claim 16, wherein one or more instructions for determining the hot working set of peers comprises:
one or more instructions for sending a multicast probe in a multicast cloud of associated optimizing devices;
one or more instructions for receiving reply signals from a set of optimizing devices, wherein the set of optimizing devices are included in the multicast cloud of the associated optimizing devices; and
one or more instructions for identifying the replying set of optimizing devices as the hot working set of peers.

21. The machine-readable storage medium of claim 16, wherein one or more instructions for receiving the identifying indices comprises one or more instructions for receiving identifying indices identifying redundant data transmitted by the second optimizing device to the hot working set of peers.

22. The machine-readable storage medium of claim 15, wherein one or more instructions for receiving the identifying indices comprises:
one or more instructions for determining the hot working set of indices using a heuristically guided technique, wherein the heuristically guided technique comprises:
one or more instructions for determining number of hits for an index, wherein the number of hits for the index is determined on the basis of number of times the index is transmitted;
one or more instructions for identifying a hot working index, wherein the number of hits for the hot working index is more than a predefined number of times in a predefined time period; and
one or more instructions for determining the hot working set of indices, wherein the hot working set of indices comprises each of the hot working index.

23. The machine-readable storage medium of claim 15, wherein one or more instructions for receiving the identifying indices comprises one or more instructions for receiving information regarding the hot working set of indices in a compressed form.

24. The machine-readable storage medium of claim 15, wherein one or more instructions for receiving the identifying indices comprises one or more instructions for receiving a summary of the information regarding the hot working set of indices.

25. The machine-readable storage medium of claim 24, wherein one or more instructions for summarizing the hot working set of indices comprises one or more instructions for summarizing the hot working set of indices using bloom filters.

26. The machine-readable storage medium of claim 25, further comprising:
one or more instructions for maintaining a local bloom filter at each optimizing device; and
one or more instructions for updating the local bloom filter periodically.

27. The machine-readable storage medium of claim 15, further comprising one or more instructions for pinning a data cache of each optimizing device, wherein the pinning prevents automatic refreshing of the data cache.

28. A method for controlling index use of a first optimized device in a network, the method comprising;
performing the following in accordance with a control parameter, wherein the control parameter is generated by an application;
receiving information at a first optimizing device from a second optimizing device regarding a third optimizing device associated with the second optimizing device, wherein the first, second, and third optimizing devices include respective first, second, and third caches: and the first, second, and third caches include respective first, second, and third tables, and wherein the first optimizing device is a new optimizing device that is added to a network that already includes the second and third optimizing devices, wherein receiving the information comprises receiving a hot working set of indices identifying redundant data transmitted by the second optimizing device to a third optimizing device for more than a predefined number of times;
receiving identifying indices at the first optimizing device from the second optimizing device, wherein the identifying indices identify redundant data transmitted by the second optimizing device to the third optimizing device, wherein the first, second, and third caches store the redundant data, and wherein the first, second, and third tables store the identifying indices, and wherein the first table of the first optimizing device is populated with the identifying indices when the first optimizing device is added to the network; and
transmitting identifying indices between the first optimizing device and the third optimizing device, wherein the identifying indices correspond to redundant data and are transmitted in place of the redundant data.

29. The method of claim 28, wherein the control parameter determines whether the identifying indices are stored at the first optimizing device.

30. The method of claim 29, wherein the control parameter is set at least in part in response to a signal from a user input device.

31. The method of claim 29, wherein the control parameter is set at least in part in response to time.

32. The method of claim 29, wherein the control parameter is set at least in part in response to network traffic load.

33. The method of claim 29, wherein the control parameter is set at least in part in response to a quality of service consideration.

34. The method of claim 29, wherein the control parameter is set at least in part according to a data type being transferred over the network.

* * * * *

UNITED STATES PATENT AND TRADEMARK OFFICE
CERTIFICATE OF CORRECTION

PATENT NO.        : 7,640,356 B2                           Page 1 of 1
APPLICATION NO.  : 11/372708
DATED             : December 29, 2009
INVENTOR(S)       : Ananthakrishnan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 676 days.

Signed and Sealed this

Twenty-first Day of December, 2010

David J. Kappos
*Director of the United States Patent and Trademark Office*